United States Patent [19]

Daido

[11] Patent Number: 4,690,233

[45] Date of Patent: Sep. 1, 1987

[54] STEERING POWER CONTROL SYSTEM IN ELECTRONICALLY CONTROLLED STEERING SYSTEM

[75] Inventor: Toshihiko Daido, Osaka, Japan

[73] Assignee: Koyo Seiko Co., Ltd., Osaka, Japan

[21] Appl. No.: 806,349

[22] Filed: Dec. 9, 1985

[51] Int. Cl.$^4$ .................................................. B62D 5/09
[52] U.S. Cl. .................................................. 180/142
[58] Field of Search ............ 180/141, 142, 143, 146, 180/147, 79.1; 74/388 PS

[56] References Cited

U.S. PATENT DOCUMENTS

| | | | |
|---|---|---|---|
| 4,224,504 | 6/1981 | Kawabata | 180/143 |
| 4,456,087 | 6/1984 | Lang | 180/142 |
| 4,473,128 | 9/1984 | Nakayama | 180/142 |
| 4,574,905 | 3/1986 | Asano | 180/142 |
| 4,624,335 | 11/1986 | Shiraishi | 180/142 |
| 4,626,994 | 12/1986 | Yabe | 180/142 |

FOREIGN PATENT DOCUMENTS

| | | | |
|---|---|---|---|
| 89512 | 9/1983 | European Pat. Off. | 180/143 |
| 2948228 | 6/1980 | Fed. Rep. of Germany | 180/142 |
| 31427 | 3/1977 | Japan | 180/143 |
| 1379606 | 1/1975 | United Kingdom | 180/142 |

Primary Examiner—John J. Love
Assistant Examiner—Everett G. Diederiks, Jr.
Attorney, Agent, or Firm—Finnegan, Henderson, Farabow, Garrett and Dunner

[57] ABSTRACT

A power steering control device in an electronically controlled power steering system in which the degree of opening of an orifice in a liquid pressure circuit is controlled to adjust the steering power assist includes a driver for controlling an actuator for the orifice, a memory for storing, in the form of a table, values set in accordance with a combination of external factors affecting the adjustment of the steering power and orifice opening-degree control data corresponding to the combined values of actual external factors, a detector for detecting the concrete values of the external factors, and an access means for reading an orifice opening-degree control signal from the corresponding memory region in the memory.

4 Claims, 8 Drawing Figures

STEERING POWER CONTROL SYSTEM IN ELECTRONICALLY CONTROLLED STEERING SYSTEM

FIELD OF THE INVENTION

This invention relates to a steering power control device in an electronically controlled steering system.

BACKGROUND OF THE INVENTION

A system of controlling the flow rate of pressurized liquid to a control valve has been proposed in the art in order to change the force needed for steering in a power steering system. In addition, a liquid pressure reaction force chamber system is known in which, as disclosed by Japanese Patent Application Publication No. 43946/1980, the equivalent spring constant between input and output shafts in a power steering mechanism is controlled by the reaction force of the liquid pressure reaction force chamber. The relative displacement of the input and output shafts is adjusted to determine the degree of opening of the control valve in order to change the steering force.

In these conventional systems, the degree of opening of the orifice in a liquid pressure circuit is changed to control the flow rate of pressurized liquid and thus set the reaction force. The degree of opening of the orifice is controlled by an actuator such as a linear solenoid, stepping motor, or DC servo motor.

In general, during the driving of a vehicle, the force needed for steering is affected by a variety of external factors. Accordingly, in order to give a suitable steering feeling to the driver of a vehicle equipped with a power steering system, it is necessary to control the degree of opening of the orifice in the liquid pressure system in accordance with these external factors.

The control of the orifice must take into account the weight of the vehicle, the number of people in the vehicle, the amount of load including the weight of cargo in the vehicle, the steering hydraulic pressure system, the characteristics of the mechanical system, and the design.

Heretofore, circuit constants for determining the relationships between the vehicle speed, orifice control data, and the configuration of the orifice have had to be finely adjusted. With the systems of the prior art, a manufacturer supplying control devices to customers must design control devices separately for the above-described external factors. In addition, adjustment is required in the tuning of the steering system to the vehicle which increases the manufacturing cost and extends the period for development.

OBJECTS AND SUMMARY OF THE INVENTION

Accordingly, an object of the present invention is a power steering control device in an electronically controlled power steering system whereby a suitable steering force can be obtained according to a variety of external factors such as vehicle running conditions and steering conditions.

Another object of the present invention is a power steering control device in an electronically controlled power steering system which is designed to quickly respond to external factors.

A further object of the present invention is a power steering control device for an electronically controlled power steering system which can be manufactured standardly and efficiently.

The foregoing objects and other objects of the invention have been achieved, according to one aspect of the invention, by the provision of a power steering control device for use in an electronically controlled power steering system of a vehicle wherein the degree of opening of an orifice in a liquid pressure circuit is controlled by an actuator to adjust the steering force, actuator driving means for driving the actuator to selectively open or close the orifice, memory means for storing a plurality of orifice control data, each of the orifice control data corresponding to a different combination of values of a set of external factors that affect the level of steering force, means for detecting the actual values of the external factors, and means responsive to the detected actual values for accessing from the memory means orifice control data corresponding to the combination of the detected actual values and supplying the accessed orifice control data to the actuator driving means to drive the actuator and correspondingly open or close the orifice to adjust the steering force in accordance with the detected actual values.

BRIEF DESCRIPTION OF THE DRAWINGS

The manner by which the above objects and other objects, features, and advantages of the present invention are attained will become more apparent from the following detailed description when considered in view of the drawings, wherein.

DETAILED DESCRIPTION OF THE PREFERRED EMBODIMENTS

A first embodiment of a power steering control device in an electronically controlled power steering system according to the present invention will be described with reference to FIGS. 1 through 4.

Figure 1:
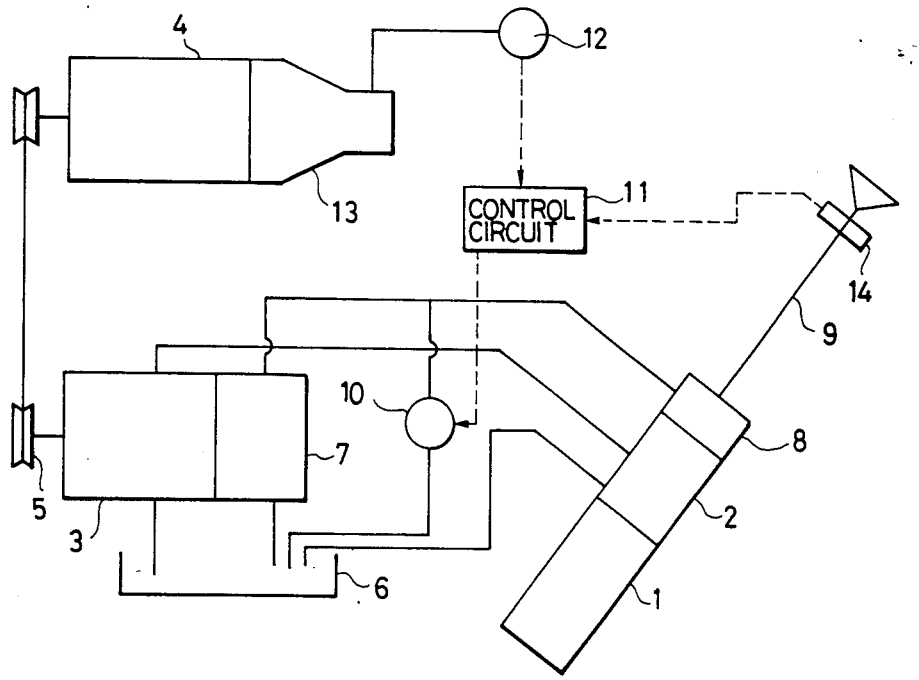
FIG. 1 is schematic view of one embodiment of a power steering control device for an electronically controlled power steering system according to the present invention.

FIG. 1 shows an arrangement of the power steering control device. The control device includes a steering unit which has a steering gear and a power assisting mechanism comprising a rack cylinder 1 and a control valve 2. The control device further includes a main pump 3 which is driven through a pulley 5, by an engine 4 so that the fluid in tank 6 is pressurized. The pressurized fluid is supplied to the control valve 2 of the power assisting mechanism and then returned into the tank 6.

Similarly, as in the main pump 3, an auxiliary pump 7 is driven by the engine 4, to pressurize the fluid in the tank 6 thereby to supply the fluid into a liquid pressure reaction force chamber 8. The reaction force chamber 8 receives the pressurized fluid to change the equivalent spring constant between a handle shaft (input shaft) 9 and an output shaft (not shown) on the other side of the steering gear. The degree of opening of the control valve 2 is determined by the relative displacement of the input shaft 9 and the output shaft, and the operation of the control valve 2 is restricted by the reaction force of the liquid pressure reaction force chamber 8.

Further in FIG. 1, an orifice 10 is provided for controlling the reaction force of the reaction force chamber 8. The degree of opening of the orifice 10 is controlled by a control signal outputted by a control circuit 11. In general, during the driving of a vehicle, the force required for steering depends on external factors such as the steering conditions or vehicle running conditions due to road conditions, i.e., whether the road is straight, curved, flat, crowned, banked, etc., the number of persons in the vehicle, the load on the vehicle, the vehicle speed, etc.

It is necessary to give a suitable steering feeling to the driver of the vehicle equipped with a power steering system. For this purpose, the control circuit 11 is designed to receive the measurement values of the aforementioned external factors to output a corresponding control signal to control the degree of opening of the orifice 10. In this case, the vehicle speed and the steering angle are selected as the external factors.

Further in FIG. 1, a vehicle speed sensor 12 electrically detects rotation of the output shaft of a transmission gear 13 to output a vehicle speed signal that is applied to the control circuit 11. A steering angle sensor 14 comprises a potentiometer and includes a stationary member (not shown) such as a casing and a slidable member (not shown). The stationary member is secured to a stationary part around the handle, while the slidable member is secured to the steering shaft 9 so that the steering angle is detected as a voltage signal that is applied to the control circuit 11.

Figure 2:
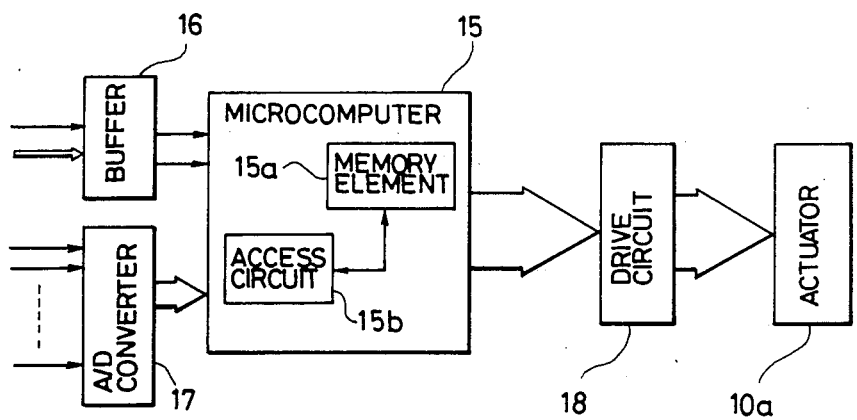
FIG. 2 is a block diagram showing a control circuit for use with the power steering control device of FIG. 1.
Figure 3:
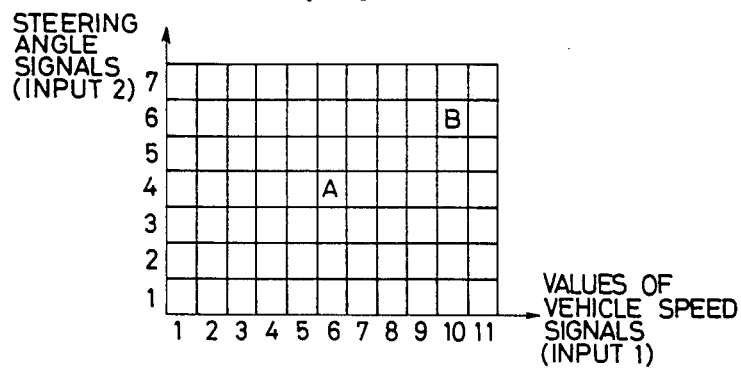
FIG. 3 is a schematic diagram showing one example of a two-dimensional table stored in a memory device in the control circuit of FIG. 2.

The control circuit 11 is shown in more detail in FIG. 2. In FIG. 2, a microcomputer 15 comprises a memory element 15a and an access circuit 15b. The memory element 15a stores, in the form of a table as shown in FIG. 3, the values of vehicle speed signals and steering angle signals, as well as orifice opening-degree control data corresponding thereto. The access circuit 15b receives the vehicle speed signal and the steering angle signal, and reads an orifice opening-degree control signal out of a location within the memory element 15a corresponding to the combination of the vehicle speed signal and the steering angle signal. The vehicle speed signal is applied through a buffer circuit 16 to the microcomputer 15, while the steering angle signal is applied to the microcomputer 15 through an A/D (analog-to-digital) converter 17.

Figure 4:
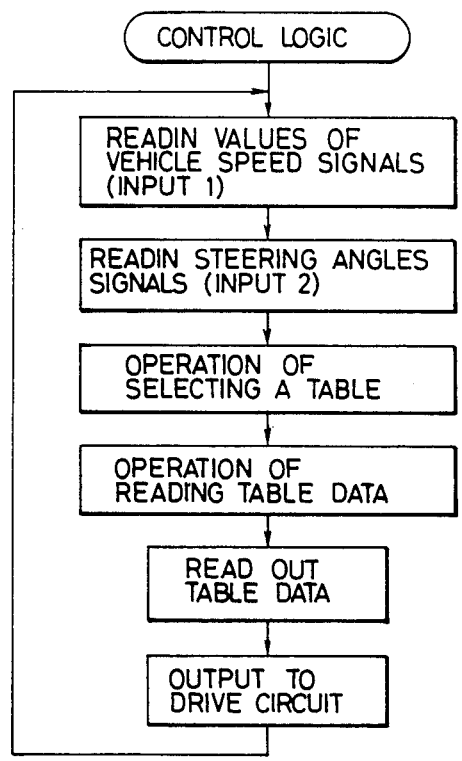
FIG. 4 is a flow chart describing of the control logic of a microcomputer used in the control circuit of FIG. 2.

A plurality of tables are provided within the memory element 15a according to the external conditions to be accommodated in setting the steering force. Selecting means is externally operated to apply a selection signal through the buffer circuit 16 to the microcomputer 15 to select a desired table. FIG. 4 is a flow chart showing the steps involved in selecting a table and the operations entailed in reading table data in the microcomputer 15.

The opening-degree control signal read out of the memory element 15a by the access circuit 15b is applied to a drive circuit 18. The drive circuit 18 operates in proportion to the magnitude of the opening degree control signal thus applied to cause the actuator 10a to adjust the degree of opening of the orifice 10. If the actuator 10a is embodied as a stepping motor, the opening-degree control signal corresponds to the number of steps to be traveresed, and if the actuator 10a is embodied as a solenoid, the signal corresponds to a current value signal.

In the above-described example, the vehicle speed and the steering angle are employed as the steering power adjusting factors; however, other external factors may be added so that three-dimentional tables, four-dimensional tables and so forth may be formed and utilized.

A second example of the power steering control device according to the present invention will be described with reference to FIGS. 5, 6, and 7. The fundamental arrangement of the power steering control device is the same as shown in FIG. 1. In the second embodiment, those components which have been previously described with reference to FIG. 1 are designated by the same reference numerals and characters.

Figure 5:
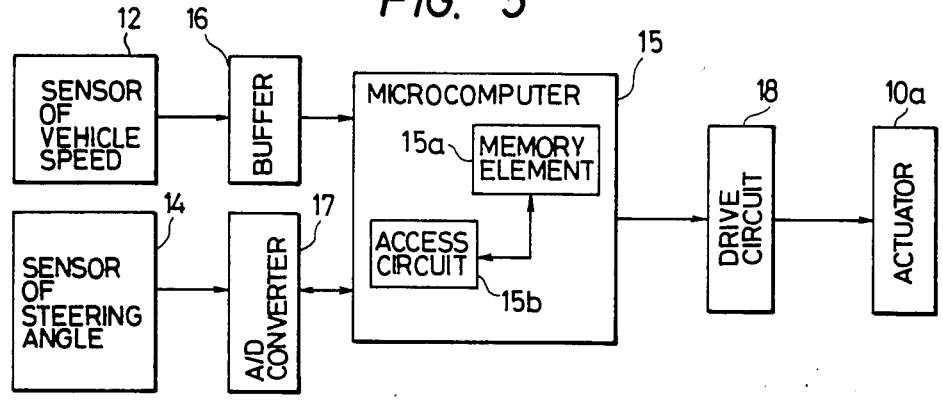
FIG. 5 is a block diagram showing a control circuit for use in another embodiment of the power steering control device according to the present invention.
Figure 6A:
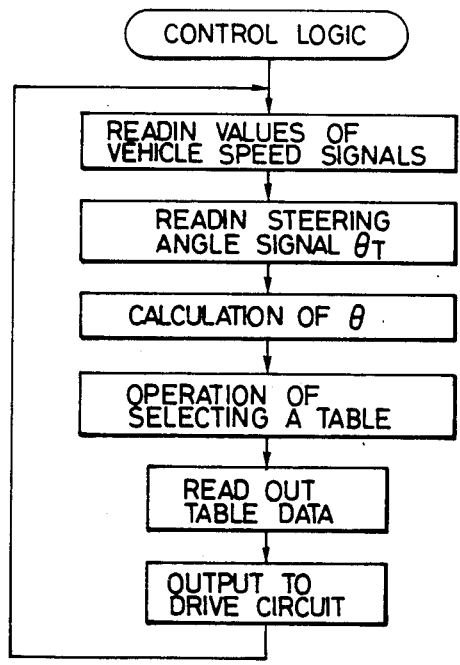
FIGS. 6 (a) and (b) are flow charts describing the control logic of a microcomputer used in the control circuit of FIG. 5.

FIG. 5 is a block diagam outlining the arrangement of a control circuit 11 adapted to output the orifice opening control signals. The values of vehicle speed signals, steering angle signals, and orifice opening-degree control data corresponding thereto are stored, in the form of a table, in the memory element 15a of a microcomputer 15. The microcomputer 15 performs the processing operations as indicated in the flow charts of FIGS. 6(a) and (b).

Figure 6B:
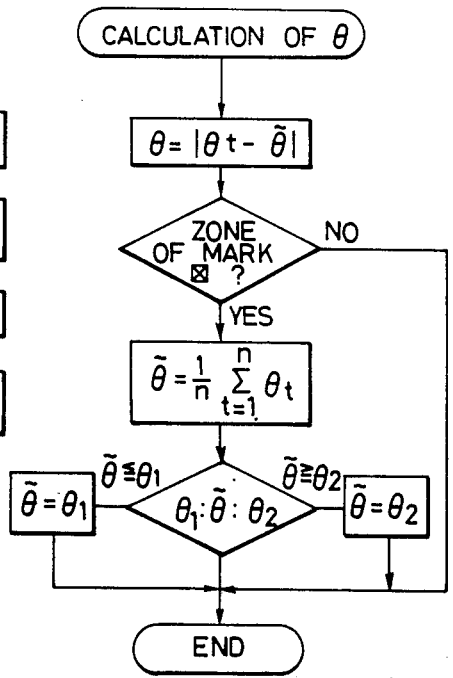

When a vehicle is moving in the straight direction, the steering center does not always coincide with the zero position of the actual steering angle. That is, the steering center may be shifted depending on road conditions, e.g., curved or flat, the number of persons in the vehicle, the load of the vehicle, and the vehicle speed. Therefore, in the program of the microcomputer 15, as shown in FIG. 6(b), the absolute value of the difference between the inputted steering angle signal $\theta_t$ and the statistical average value $$\tilde{\theta} = \frac{1}{n} \sum_{t=1}^{n} \theta_t$$

of the steering angle signal is obtained. The corresponding memory region of the memory element 15a is accessed according to the corrected steering angle signal $\theta$.

Figure 7:
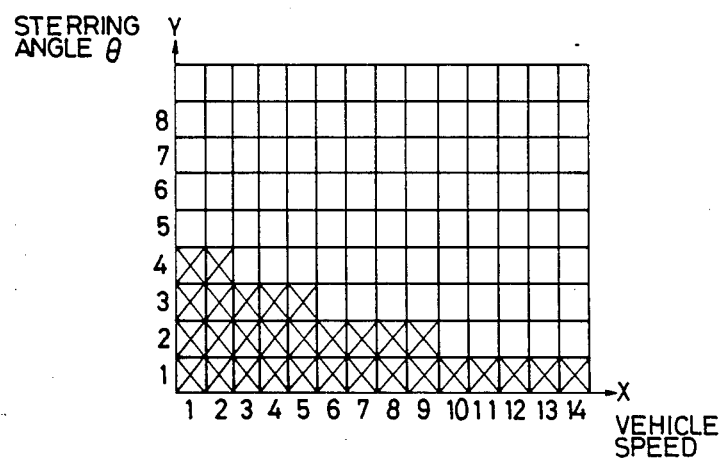
FIG. 7 is a schematic diagram of an example of a two-dimensional table stored in a memory device of the control circuit of FIG. 5.

The calculation of the statistical average value $\tilde{\theta}$ of the steering angle signal is not always carried out; that is, it is performed only for the period that the inputted steering angle signal $\theta_t$ is in a region marked with x in the table of FIG. 7. As the speed of the vehicle increases, the steering angle is decreased. Therefore, in the table of FIG. 7, the number of regions marked with x is decreased as the vehicle speed increases.

In the calculation of the steering angle signal, the upper limit value $\theta_2$ and the lower limit value $\theta_1$ are set for the statistical average value $\tilde{\theta}$, so that, when the result of the calculation exceeds the upper limit value $\theta_2$, the average value $\tilde{\theta}$ is set to $\theta_2$. When the result of the calculation below the lower limit value $\theta_1$, the average value $\tilde{\theta}$ is set to $\theta_1$.

Similarly, as in the first example of the power steering control device, the orifice opening-degree control signal read out of the memory element 15a is applied to the drive circuit 18. As a result, the drive circuit 18 is driven in proportion to the magnitude of the orifice opening-degree control signal to cause the actuator 10a to adjust the degree of opening of the orifice 10.

It goes without saying that the statistical average value $\bar{\theta}$ may be calculated according to a calculation system other than that descried above.

As is apparent from the above description, the first example of the power steering control device according to the present invention is designed so that the table stored in the memory means is replaceable, or so that a suitable one of plural kinds of tables may be selected. Therefore, the steering force can be controlled according to variations in various external factors such as vehicle running conditions and steering conditions, and the control circuit can be standardized with the result that the manufacturing cost can be reduced and the period of development can be decreased.

The second example of the steering power control device according to the present invention has the same effects as the first example described above. Furthermore, the second example further includes steering angle signal correcting means that allows the detection of steering angle from the angle during straight operation. Therefore, steering force corresponding to the steering angle of a vehicle during running conditions can be obtained according to the present invention.

What is claimed is:

1. A power steering control device for use in an electronically controlled power steering system of a vehicle wherein the degree of opening of an orifice in a liquid pressure circuit is controlled by an actuator to adjust the steering force, the device comprising:

actuator driving means for driving the actuator to selectively open or close the orifice;
   memory means for storing a plurality of orifice control data, each of said orifice control data corresponding to the effect on the level of steering force of a different combination of values of a set of external factors that affect the level of steering force, said factors including the steering angle of the vehicle and the vehicle speed;
   means for detecting the actual values of each of said external factors, said detecting means including a vehicle speed sensor and a steering angle sensor correcting means for sampling for a predetermined period of time the steering angle of the vehicle, for computing the average value of said sampled steering angle, and for outputting the absolute value of the difference between the steering angle and the computed average thereof; and
   means responsive to said detected actual values including the vehicle speed and said absolute value for accessing from said memory means orifice control data corresponding to the combination of said detected actual values and supplying said accessed orifice control data to said actuator driving means to drive the actuator and correspondingly open or close the orifice to adjust the steering force in accordance with said detected actual values.

2. A power steering control device according to claim 1, wherein said accessing and supplying means comprises a microcomputer.

3. A power steering control device according to claim 1, wherein said detecting means comprises:
   a speed sensor for generating a first output signal corresponding to the speed of the vehicle; and
   a steering angle sensor for generating a second output signal corresponding to the steering angle of the vehicle.

4. A power steering control device for use in an electronically controlled power steering system of a vehicle wherein the equivalent spring constant between an input steering shaft and an output steering shaft is controlled by an actuator that selectively opens and closes an orifice in a liquid pressure circuit to correspondingly control the supply of pressurized liquid to a liquid pressure reaction force chamber to control the relative displacement between the input steering shaft and the output steering shaft and thereby selectively set the degree of opening of a control valve to adjust the steering force, a control device comprising:

actuator driving means for driving the actuator to adjust the degree of opening of the orifice and thereby the supply of pressurized liquid to the reaction force chamber;
   memory means for storing a plurality of orifice control data, each of said orifice control data corresponding to the effect on the level of steering force of a different combination of values of a set of external factors, said factors including the steering angle of the vehicle and the vehicle speed;
   means for detecting the actual values of said external factors, said detecting means including a vehicle speed sensor and a steering angle signal correcting means for sampling for a predetermined period of time the steering angle of the vehicle, for computing the average value of said sampled steering angle, and for outputting the absolute value of the difference between the steering angle and the computed average thereof; and
   means, responsive to said detected values including the vehicle speed and said absolute value, for accessing from said memory means orifice control data corresponding to the combination of said detected actual values and said absolute value and for supplying said accessed orifice control data to said actuator driving means to drive the actuator and correspondingly open or close the orifice to adjust the supply of pressurized fluid to the reaction force chamber.

* * * * *